Feb. 2, 1960 S. K. RAKER 2,923,923

BIASED MAGNETIC STORAGE SYSTEM

Filed Oct. 31, 1956 3 Sheets-Sheet 1

INVENTOR.
SAMUEL K. RAKER

BY Paul McEnlow

AGENT

WRITING "1"

STORED "1"

READING "1"

STORED "0"

INVENTOR.
SAMUEL K. RAKER
BY Paul McElow
AGENT

Feb. 2, 1960 S. K. RAKER 2,923,923

BIASED MAGNETIC STORAGE SYSTEM

Filed Oct. 31, 1956 3 Sheets-Sheet 3

INVENTOR.
SAMUEL K. RAKER

BY Paul M Enlow

AGENT

United States Patent Office 2,923,923
Patented Feb. 2, 1960

2,923,923

BIASED MAGNETIC STORAGE SYSTEM

Samuel K. Raker, Washington, D.C., assignor to International Business Machines Corporation, New York, N.Y., a corporation of New York Application October 31, 1956, Serial No. 619,484

14 Claims. (Cl. 340—174)

This invention relates to magnetic devices and more particularly to improvements in magnetic cores for use in memory systems.

The prior art is replete with systems employing magnetic cores in storage matrices wherein the remanent state of each core is switched by the coincidence of current pulses applied to suitable driving windings. Such cores are required to exhibit a substantially rectangular hysteresis loop. Information is stored in such cores by reference to the remanent state which is altered by additive coincident current pulses producing a resultant M.M.F. greater than twice the threshold force. A voltage is induced in a sense winding encompassing each of the cores when an alteration of the remanent state occurs. In a coincident current system, the current pulses must be accurately regulated in order to ensure that the half selection of a core does not switch it to the opposite state. The switching speed of a core embodied in a coincident current system is also limited by the core material. Further, the half select pulses effect traversals of minor hysteresis loops causing objectionable output signals. The fact that the magnitude of each current pulse is limited prescribes a limitation on the speed with which the remanent state of a core may be altered.

Accordingly, the present invention obviates the above difficulties by utilizing a biased flux coincidence selection system which is independent of the threshold force relied on in the coincident current systems. The present invention is an improvement over the coincidence flux system described and claimed in co-pending application Serial No. 546,180 filed November 10, 1955, now Patent No. 2,869,112 which is incorporated herein by reference.

The invention includes a magnetic core comprising a main flux path having a first segment divided into a first pair of flux paths and a second segment thereof divided into a second pair of flux paths. Bias means are provided for saturating the paths of said first pair in opposite directions. In the quiescent state of the core, the direction of the flux in the paths of said second pair is indicative of the information stored therein. A plurality of driving means link the main flux path, and a sense means links a predetermined one of said second paths. The energization of a single driving means produces a driving M.M.F. less than the bias flux in either of said first pair of flux paths and thus is ineffective to alter the flux pattern in either of said second paths. However, the simultaneous energization of all the driving means in the same relative polarity produces a total M.M.F. which overcomes the bias M.M.F. in one of the first paths and saturates the main path of the core in the clockwise or a counterclockwise direction. Thus, the total driving M.M.F. reverses the direction of the flux of one of said second paths. Upon the cessation of the driving M.M.F., the original pattern of the bias flux is reestablished and the flux in one of said second paths is reversed. If the direction of the total flux is such as to effect a flux reversal in the path associated with the sense means, an output signal is produced.

By increasing the magnitude of the bias flux of the invention, the magnitude of each input pulse may be increased. Thus, high switching speeds are obtainable by using large pulses having short rise times in the millimicrosecond range. Further, the novel biasing technique eliminates undesired voltages normally produced in a coincident flux selection system by alterations of the flux around the drive hole in half selected cores.

Accordingly, an object of the present invention is to provide an improved magnetic core operable at swtching speeds in the millimicrosecond range.

A further object is to provide an improved magnetic core operable by coincidence selection which overcomes a bias flux.

Another object is to provide a magnetic core wherein the input pulses may be of any desired magnitude.

A further object is to provide a logical element responsive to the coincidence of a plurality of input signals to produce an output signal.

A further object is to provide an improved magnetic core having a predetermined bias flux which must be reversed in order to switch the remanent state of the magnetic core.

A further object is to provide an improved magnetic memory element wherein the switching speed is not limited by the magnetic material.

A further object is to provide an improved magnetic core which presents a substantially constant load to the current driving means.

Other objects of the invention will be pointed out in the following description and claims and illustrated in the accompanying drawings which disclose, by way of example, the principle of the invention and the best mode, which has been contemplated, of applying that principle.

Figure 1A:
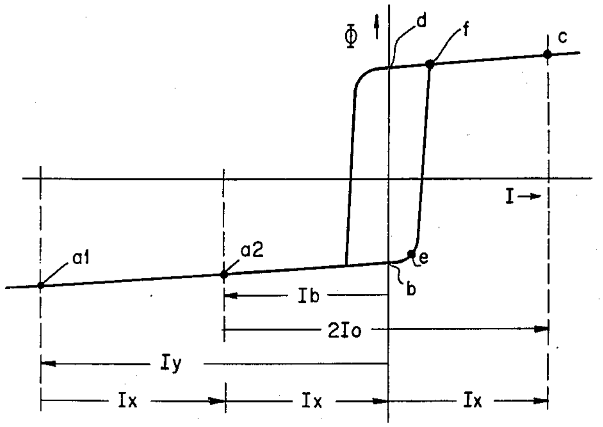
Fig. 1A is a hysteresis loop illustrating the relative magnitudes of the bias and selection currents.
Figure 1B:
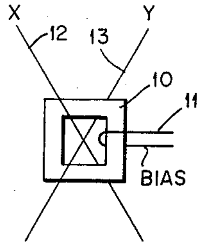
Fig. 1B illustrates a simple biased core.

The invention utilizes the phenomenon of biasing a flux path of a magnetic core well into saturation by a bias current. Driving currents producing a M.M.F. in opposition to the bias M.M.F. are applied to the core so as to overcome the bias and switch the core to the opposite remanent state. By utilizing a biasing technique the driving currents applied to the core may comprise currents of large magnitude having very short rise times. The principle of operation of a biased core is illustrated in Figs. 1A and 1B. Fig. 1A illustrates the hysteresis loop of the magnetic core illustrated in Fig. 1B.

Fig. 1B illustrates a rectangular magnetic core having a bias winding 11 linking one leg thereof. X and Y selection means are provided by windings 12 and 13, which each intersect the aperture of the core. Consider, for example, that a bias current $I_b$ is applied to bias winding 11 so as to bias the core into saturation at point "$a_2$" of Fig. 1A. Driving currents are applied to the X and Y windings in a direction to create a M.M.F. opposing the bias flux. When a unit of current $I_o$ is applied to either the X or Y winding, the bias M.M.F. is cancelled but the core is not switched to the opposite remanent state. The core is not switched since the magnetic material thereof merely traverses the path from "$a_2$" to "$b$" in Fig. 1A, said path being substantially linear and reversible. However, when two units of current $2I_o$ are applied to the core by means of the X and Y drive windings, the material of the core is driven from the point "$a_2$" to the point "$c$" of the upper remanent state. Thus far it is apparent that by properly adjusting the magnitudes of the bias current and the individual drive currents, the magnitude of each drive current may be increased so that large pulses having short rise times may be utilized to improve the switching speed of the core. With respect to Figs. 1A and 1B, it is apparent that the core has no memory since the removal of the driving current permits the core to switch back to the lower remanent state. The biasing technique described above with respect to Figs. 1A and 1B is utilized in conjunction with a multi-legged core having provision for maintaining a portion of the core in either of two remanent states so as to represent the storage of information.

It should be noted that each drive current $I_o$ need not be equal to the bias current $I_b$, but rather may comprise a plurality of current pulses $I_x$ which additively overcome a bias current $I_y$ as illustrated in Fig. 1A.

Figure 2:
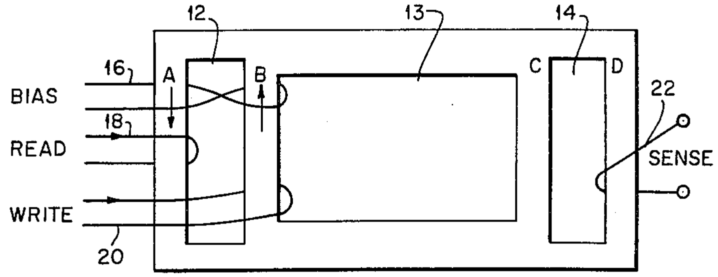
Fig. 2 illustrates one form of the invention wherein the magnetic core is rectangular and includes a plurality of flux paths.
Figure 3:
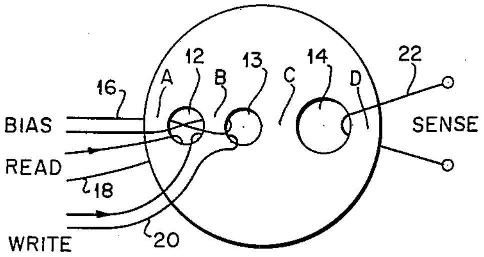
Fig. 3 is a representation of a toroidal magnetic core embodying the invention.

Referring more particularly to Figs. 2 and 3, a rectangular and a toroidal embodiment of the improved magnetic core is illustrated. In Figs. 2 and 3 the memory device includes apertures 12, 13 and 14 which divide the core into four flux paths A, B, C and D, of substantially equal cross-sectional area. The modified structure of Fig. 3 includes reference characters similar to those of Fig. 2. Although a rectangular and toroidal embodiment of the structure is illustrated, other configurations of the core and the apertures therein are contemplated to be within the scope of the present description and claims.

The rectangular core of Fig. 2 includes a bias winding 16 arranged in a figure eight pattern to encompass the input legs A and B of the core. A read winding 18 and a write winding 20 are illustrated as respectively linking legs A and B. Windings 16, 18 and 20, while illustrated as a single turn, may comprise a plurality of turns wound in either direction. However, the direction of the currents applied to these windings, taken in conjunction with the direction of the windings, are considered to establish the flux patterns described hereinbelow. A sense winding 22 is provided which encompasses the output leg labelled "D" in Figs. 2 and 3 and is remote from the input windings.

A bias current is applied to the figure eight bias winding 16 which produces a flux downward in one input leg and upwards in the other. The bias current can comprise a pulse applied during read and write operations or can be a direct current which is continuously applied to the bias winding. The bias current must be sufficiently large to drive each leg well into saturation on the hysteresis loop of Fig. 1. When a current is applied to bias winding 16 in the direction illustrated in Fig. 2, the input legs are saturated by flux in the direction of the arrows shown on legs A and B.

The application of a drive current pulse $I_o$ to either the read winding 18 or the write winding 20 in a direction to create a M.M.F. opposing the bias M.M.F., has substantially no effect if the magnitude of the current is approximately equal to or less than the bias current.

Such a drive current has little effect on the status of the core since the core material is driven along a low permeability path which is reversible. However, if a drive current $2I_o$ is applied to one of the input windings 18 or 20 in a direction opposite to the bias current $I_b$, the appropriate leg of the core is driven by the net difference between the driving and bias currents. Reference to Fig. 1A indicates that the drive current $2I_o$ is sufficient to switch the input leg to the opposite remanent state. Upon the removal of the driving current the leg is again subject only to current $I_b$ and thus the flux in the leg is switched back to the initial condition existing prior to the application of the driving currents.

The application of a driving current $I_o$ equal to the bias current $I_b$ is defined as the half select condition of the core. Since a half select current is incapable of traversing the knee of the hysteresis loop at point "$e$" of Fig. 1A, the flux existing in leg C and D is substantially undisturbed. However, when the core is fully selected by the application of a driving current $2I_o$, the bias flux in either input leg A or B is reversed and the net driving M.M.F. produces a total flux throughout the core in a clockwise or a counterclockwise direction. For example, if the driving current is applied to leg A, the bias flux is reversed and the flux existing in legs A and B is flowing in an upward direction towards the upper extremities of legs C and D, and the flux is flowing downward in both of the legs C and D. On the other hand, when the driving current is applied to leg B, the flux throughout the core is established in a counterclockwise direction so that the flux in legs A and B is downwards and the direction of the flux in legs C and D is upwards.

The direction of the flux in legs C and D after the driving currents applied to winding 18 or 20 of Fig. 2 have been removed is indicative of the information stored in the improved magnetic core. When the direction of the flux in leg D is upward, during the quiescent state of the core, it may be arbitrarily said to be storing a binary 1 bit. Hence, when the direction of the flux in leg D is downward during the quiescent state, the core may be said to be storing a binary 0.

Briefly, in order to write a binary 1 in the core of Fig. 2, a current is applied to write winding 20 which reverses the bias flux in leg B and establishes the flux throughout the core in a counterclockwise direction. During the application of the driving current to winding 20, the flux in legs A and B is downward, and is upward in legs C and D. Upon the cessation of the driving current the direction of the flux in leg B changes to its original upward direction and the flux in leg C changes to the downward direction. The direction of the flux in leg D remains unchanged and thus is indicative of a binary 1. The application of a driving current to read winding 18 is effective to read out the information stored in the core and is also effective to store a binary 0 representation upon the cessation of the driving current. Thus the application of a driving current to leg A reverses the flux therein and creates a flux throughout the core in a clockwise direction. The clockwise flux requires the flux in legs C and D to be downward. Hence, if the flux in leg D were previously upward (indicating a storage of a binary 1 bit) the reversal of the flux therein induces a voltage signal in sense winding 22. Upon the cessation of the driving current applied to read winding 18, the flux in leg A returns to its initial direction and the flux in leg C returns to the upward direction. The fact that the flux in leg D now flows in a downward direction is indicative of the storage of a binary 0.

It is now apparent that the multi-path core structure can have two distinctly different flux patterns for storing information even though the input legs of the core exist in a biased saturated condition. Note that the flux in legs A and B always returns to the same direction upon the removal of the driving currents regardless of the information stored in the core. Accordingly, the current drivers connected to an array, for example, are subjected to the same load regardless whether the cores are storing binary 1's or binary 0's. Thus the requirement of a current regulating system under changing load conditions is eliminated.

Figure 4:
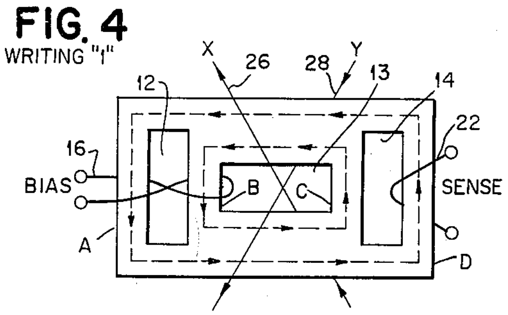
Fig. 4 illustrates a first flux pattern established in the memory element when a binary 1 is written therein.

The operation of the core of Fig. 2 is more completely described hereinbelow with respect to Figs. 4, 5, 6, 7 and 8. Referring more particularly to Fig. 4, a magnetic core having modified input windings is illustrated. The read and write windings 18 and 20 of Fig. 2 are replaced by the X and Y windings 26 and 28 of Fig. 4. Windings 26 and 28 of Fig. 4 each link the main flux path of the core by intersecting the center aperture 13. The X winding is placed beneath the lower portion of the core, passes through aperture 13 and is arranged adjacent the top side of the upper portion of the core. The Y winding 28 is juxtaposed beneath the upper portion of the core, passes through aperture 13 and is placed on top of the lower portion of the core. Accordingly, when a current is applied to flow upward through winding 26, a magnetic field is produced which tends to cause a flux to flow to the left in the upper portion of the core and to flow to the right in the lower portion thereof. Similarly, a current flowing downward through winding 28 of Fig. 4 tends to produce a flux flowing to the right in the lower portion of the core and flowing to the left in the upper portion thereof. Hence, it is seen that when selection currents are applied to windings 26 and 28 of Fig. 4 in the directions illustrated, the M.M.F. produced by each current are additive to produce a main flux flowing in a counterclockwise direction around the core. The production of a clockwise or counterclockwise flux in a multi-legged core by the coincidence flux selection system is fully described in co-pending application Serial No. 546,180 filed November 10, 1955 now Patent No. 2,869,112. While the selection windings 26 and 28 of Fig. 4 are illustrated as a single turn, it is apparent to one skilled in the art that each winding may comprise a plurality of turns. Further, it will become apparent hereinbelow that the operation of the core of Figs. 4–8 is identical to the operation of the core of Fig. 2; that is, the operation of the core is substantially the same regardless whether the input windings of the type illustrated in Fig. 2 or of the type illustrated in Fig. 4 are utilized.

During a write operation, select currents are applied to the X and Y windings in the directions illustrated in Fig. 4, whereas during a read operation the directions of the currents are reversed. Hence, the X and Y windings 26 and 28 of Fig. 4 effect the same functions as the read and write windings 18 and 20 of Figs. 2 and 3.

Figure 5:
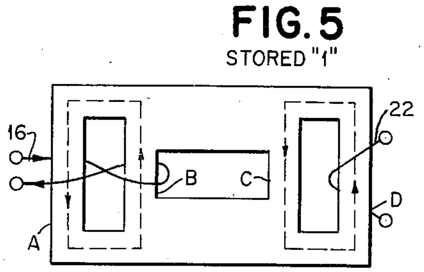
Fig. 5 illustrates the resultant flux pattern when a binary 1 is being stored in the core.
Figure 6:
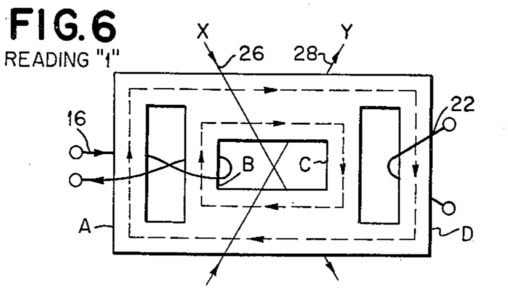
Fig. 6 illustrates a third flux pattern present in the core when a binary 1 is being sensed.
Figure 7:
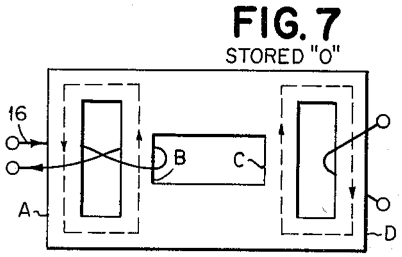
Fig. 7 illustrates the resultant flux pattern when the memory element is storing a binary 0.

Briefly, Fig. 4 illustrates the counterclockwise flux pattern arising in the memory device during the application of select currents in a direction to produce the writing of a binary 1; Fig. 5 illustrates the resultant flux pattern in the core after the write currents applied to windings 26 and 28 of Fig. 4 have subsided; Fig. 6 illustrates the clockwise direction of the flux in the memory element during the application of currents to windings 26 and 28 during a read operation to sense the representation of a binary 1 or a 0 stored in the core; and Fig. 7 illustrates the resultant flux pattern occurring in the magnetic core during the storage therein of a binary 0. A discussion of the flux pattern occurring in a multi-legged core when a select current is applied to one of the windings 26 or 28, but not both of them, whereby the core is in the half select condition is thoroughly described in co-pending application Serial No. 546,180 filed November 10, 1955 which is included herein by reference.

Referring again to Fig. 4, a particular core is selected during a write operation when a current is applied to winding 26 in the direction illustrated simultaneously with the application of a current to winding 28 in the indicated direction. The total current flowing in windings 26 and 28 must additively produce a M.M.F. flux sufficient to overcome the bias M.M.F. and to drive the core from the lower remanent state, for example, of Fig. 1 to the upper remanent state. Prior to the application of select currents to windings 26 and 28, legs A and B are saturated in the directions illustrated in Fig. 2, that is, leg A is saturated upwards and leg B is saturated downwards. The application of write select currents to windings 26 and 28 of Fig. 4 create a counterclockwise flux which effects the reversal of flux in leg A and requires the flux in legs C and D to be in the upward direction. Note that in storing a binary 1, leg D is saturated in the upward direction.

The resultant flux pattern existing in the quiescent core after the currents applied to the X and Y windings 26 and 28 of Fig. 4 have subsided, is illustrated in Fig. 5. The comparison of Fig. 5 with Fig. 4 indicates that following the write operation the flux in legs B and C is reversed. This occurs since the reluctance of the flux paths from the legs incorporating the bias winding is shorter through leg C than through the distant leg D. The fact that leg D remains saturated in the upward direction indicates that a binary 1 is being stored in the core.

Referring to Fig. 6, the dynamic state of the flux in the improved core during a reading operation is illustrated. In order to read out the information stored in the core, the X and Y selection currents are applied in the directions indicated in Fig. 6. The coincidence of the driving currents in windings 26 and 28 produces a main flux flowing in a clockwise direction throughout the core. The clockwise flux produced by the driving currents effects a reveral of the bias flux in leg A and requires the flux in legs C and D to be flowing downward. Assuming that prior to the application of the selection currents the quiescent state of the flux in the core was that illustrated in Fig. 5 when the core is storing a binary 1, the clockwise flux illustrated in Fig. 6 effects a reversal of the flux in leg D. The alteration of the direction of the flux in leg D induces a voltage signal in sense winding 22 which is indicative of the fact that the core was previously storing a binary 1.

During a reading operation the flux pattern illustrated in Fig. 6 remains until the selection currents applied to windings 26 and 28 are removed. Upon the removal of the selection currents, the flux in leg A returns to its initial status due to the bias flux, and the flux flowing in leg C is reversed in direction since the reluctance of the path from leg A through leg C is smaller than the reluctance of the path from leg A through leg D.

As stated above, when a magnetic core is in the quiescent state and is storing a binary 0, the flux in legs A, B, C and D will exist in the directions illustrated in Fig. 7. It should also be noted that following each reading operation the flux pattern always reverts to that illustrated in Fig. 7 following the cessation of the driving currents. This is true regardless whether the core was previously storing a binary 1 or a binary 0.

When a core is storing a binary 0 and the driving currents are applied to the selection windings 26 and 28 in the directions illustrated in Fig. 6, so as to effect a reading operation, the direction of the flux in leg D is not subjected to a reversal. Accordingly, a voltage signal is not induced in sense winding 22, and thus the absence of a voltage signal is indicative of the reading out of a binary 0. After each reading operation, the core is always returned to the stored zero state indicated by the flux pattern of Fig. 7.

It is to be noted that during the dynamic state of the core, that is, when reading or writing selection currents are being applied thereto, the entire flux throughout the core must exist in a clockwise or a counterclockwise direction. However, during the quiescent state when the selection currents have been removed the flux in legs A and B exist in opposite directions, and the flux in legs C and D exist in opposite directions. During the quiescent state the flux in legs A and B is always returned to an initial state due to the direction of the current flowing in the bias winding. However, the flux flow in the path including legs C and D may exist in a clockwise or a counterclockwise direction about aperture 14, depending on whether the core is storing a binary 1 or a binary 0. It should be reiterated that when the core is half selected, that is, a selection current is applied to only one of the windings 26 or 28, the flux pattern established in legs C and D remains substantially unchanged.

Figure 8A:
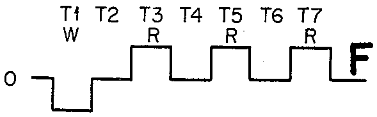
Figs. 8A–8C illustrate waveforms associated with Figs. 4–7 during the operation of the core.
Figure 8B:
Figure 8C:
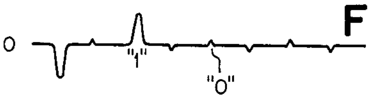

Referring more particularly to Figs. 8A through 8C, the waveforms of the current pulses applied to the X and Y selection windings and the waveform of the output pulse appearing in the sense winding are illustrated. Prior to time interval T1 of Figs. 8A–8C, it is assumed that the core is storing a binary 0 so that the flux pattern illustrated in Fig. 7 is present. During interval T1 a binary 1 is stored in the core by applying X and Y selection currents in a direction to produce writing. The direction of write selection currents is illustrated by the arrowheads on windings 26 and 28 of Fig. 4. Since it is assumed that the core was storing a binary 0 prior to interval T1, the reversal of the flux in leg D produces a negative direction output pulse in the sense winding, as indicated in Fig. 8C.

During interval T2, the core is storing a binary 1 and the quiescent flux state exists in the pattern indicated in Fig. 5. During interval T3 the X and Y selection currents are applied in the directions indicated on windings 26 and 28 of Fig. 6 so as to effect a reading operation. An output pulse is produced in sense winding 22 since the reading operation effected a reversal of the flux in leg D. Following the reading operation of interval T3, the improved magnetic core is storing a binary 0 and the flux pattern existing in the core is that illustrated in Fig. 7.

During interval T5 a reading operation is again performed but an output pulse is not produced since the core was storing a binary 0 during interval T4. Following interval T5 the core again is storing a binary 0. The condition known as half selection of the core is illustrated in interval T7 during which a driving current is applied only to the X selection winding 26. During the half select condition, the flux in the output leg D is substantially unaffected and thus the half select signal produced in sense winding 22 is insignificant. Thus, it is clear that the improved magnetic core provides a signal-to-noise ratio which is greatly improved over magnetic cores found in the prior art. Further, since all of the core signals are of the same polarity, half select noise cancellation with an alternating sense winding is possible in an array of cores.

With respect to Figs. 4–7, it should be appreciated that a sense winding may be utilized which links leg C rather than leg D. Under these conditions the core will be storing a binary one after each reading operation, and during a writing operation a binary zero will be stored. While path directions have been assigned to the selection currents to effect reading and writing operations in the above descriptions, it is apparent that the polarities of the reading and writing currents may by reversed and still effect the storage of information. It is also possible, for example, to interchange the read and write windings 18 and 20 of Fig. 2. The actual method of operation of the core will depend upon the logic of the memory system with which the core is used.

Figure 9:
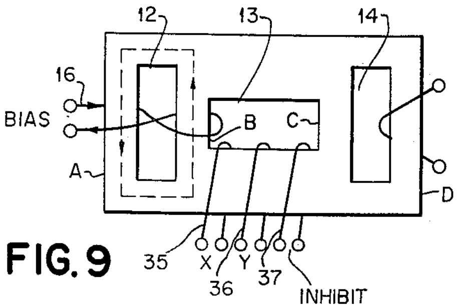
Fig. 9 is a diagram of a multi-legged magnetic core having modified input windings.

Referring more particularly to Fig. 9, a variation in the input windings is illustrated. In Fig. 9, the bias winding 16 is arranged to encompass legs A and B in the same manner described hereinabove with respect to Figs. 2–7. The X selection winding 35 and the Y selection winding 36 are arranged to pass through the center aperture 13 to thereby link the main flux path of the core. An inhibit winding 37 is also provided which may be utilized to prevent the storage of a binary one in the core when the core forms a component in a storage matrix. It is apparent that, rather than including the inhibit winding 37, the operation of the core can be inhibited by applying a current equal to twice the normal bias current to the bias winding 16 of Fig. 9. The increased bias current has the effect of prohibiting the establishment of a main flux throughout the core by selection currents applied to windings 35 and 36.

Figure 10:
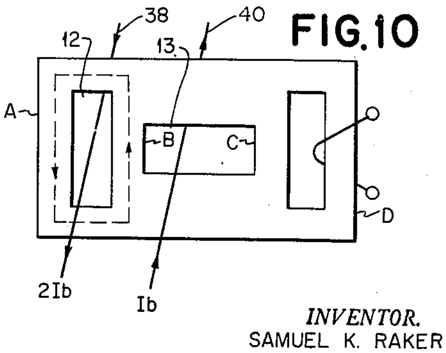
Fig. 10 is a diagram of a magnetic core with a modified bias winding.

The figure eight bias winding 16 illustrated in Figs. 2–7 and 9, requires that each turn of the winding intersect aperture 13 once and intersect aperture 12 twice. In order to ease the method of assembly of the bias winding, the figure eight winding of Fig. 9 may be replaced by windings 38 and 40 illustrated in Fig. 10. Winding 38 of Fig. 10 is applied to intersect aperture 12, and winding 40 is applied to intersect aperture 13. A current equal to twice the normal bias current, that is $2I_b$ (see Fig. 1A) is applied to winding 38 in the direction indicated, and a current $I_b$ is applied to winding 40 in the opposite direction. A comparison of the arrangement of Fig. 10 with the figure eight bias winding of Fig. 9, for example, indicates that the legs A and B will be biased in the same manner. In Fig. 9, for example, the figure eight bias winding passes through aperture 12 twice so that a current equal to $2I_b$ is applied to the material of the core surrounding this aperture. Similarly, since the figure eight bias winding passes through aperture 13 only once, a current of $I_b$ is applied to the surrounding magnetic material, hence the equivalence of the bias windings of Figs. 9 and 10.

Figure 11:
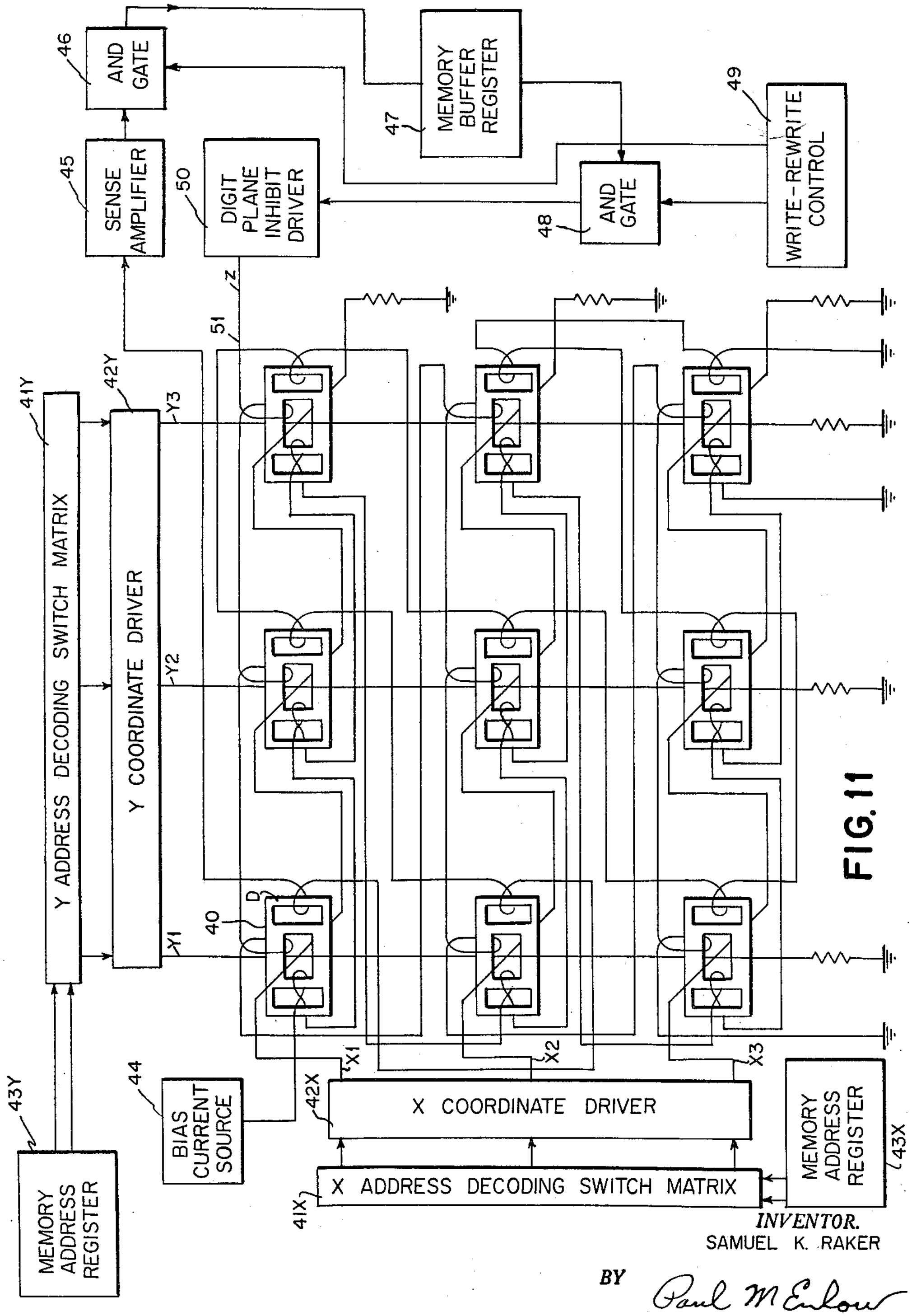
Fig. 11 is a representation of a plane of a three-dimensional storage matrix encompassing the invention.

The improved magnetic core illustrated in Fig. 2 may be utilized in a two-dimensional matrix memory as illustrated in Fig. 11. The matrix may also be utilized in a three-dimensional array requiring an additional Z winding frequently referred to as an inhibit winding. Although Fig. 11 illustrates a single 3×3 memory plane comprising a total of nine cores, it is apparent that the number of cores may be increased without departing from the scope of the invention.

When the matrix of Fig. 11 is incorporated in a three-dimensional selection system, a plurality of memory planes corresponding to Fig. 11 are arranged so as to store a plurality of multi-bit binary words. The selection of a particular word is effected by energizing the appropriate X, Y and Z selection windings associated with each core. The sense windings of all the cores of a single plane are connected together so as to permit the read-out of each bit of a multi-bit binary word.

In order to write a word in a three-dimensional system, the X and Y windings are pulsed in a direction so as to write a 1 in each selected core, providing the inhibit winding for the plane is not energized. A binary 0 is entered during a write operation by energizing the appropriate X and Y selection windings and simultaneously energizing the Z or inhibit winding. The energization of the Z winding produces a flux counteracting the flux produced by the X and Y windings so as to prohibit the storage of a binary 1 in the selected core. As stated hereinabove, rather than introduce a separate Z or inhibit winding on each core, the inhibit process can be accomplished by increasing the bias current to twice its normal magnitude.

Referring to Fig. 11, the selection of core 40, for example, is effected by energizing X1 and Y1 windings which link the core. The X and Y selection windings are selectively energized through a decoding matrix 41 and an appropriate pulse driver 42. The decoding matrix 41 for the X and Y coordinance is controlled by the X and Y memory registers labeled 43X and 43Y, respectively. The decoding matrices may be in the form of a diode matrix as shown in co-pending application Serial No. 376,300 filed August 25, 1953, now Patent No. 2,739,300, or may be of the type described in "Rectifier Networks for Multi-Position Switching," Proc. I.R.E., vol. 37, pp. 139–147, February 1949. Suitable current drivers fulfilling the function of the X and Y coordinate drives 42X and 42Y may comprise magnetic cores as described in application Serial No. 440,983 filed July 2, 1954 by R. G. Counihan, now abandoned, or may comprise transistors as described in application Serial No. 511,082 filed May 25, 1955 by J. B. MacKay, et al.

As stated above, the selection of a particular word stored in a three-dimensional storage matrix is accomplished by energizing the appropriate X and Y selection windings corresponding to the cores storing the desired word. The energization of the X and Y windings must occur simultaneously, for at least a predetermined interval, but may be staggered as set forth in application Serial No. 442,013 filed July 8, 1954 by M. K. Haynes, now Patent No. 2,881,414.

During a read interval the X and Y windings of core 40, for example, are energized so as to attempt to return the core to the state corresponding to the storage of a binary 0. On the other hand, during a write interval the X and Y windings are energized so as to attempt to store a binary 1 in the selected core. Thus, if a binary 0 is to be stored in a selected core during a write interval, the Z or inhibit winding of the core must be energized so as to prevent the core from being switched to the state corresponding to a binary 1.

If during a read interval the direction of the flux in leg D of selected core 40, for example, is reversed, a voltage signal is induced in sense winding 44 which is applied to sense amplifier 45. The signal is amplified by amplifier 45 and gated through AND gate 46 to the memory buffer register 47. If the binary 1, in the example above, is to be returned to the core from which it was read out during the previous read interval, an output signal from the memory buffer register is applied to AND gate 48 which is controlled by the write-rewrite control circuit 49. The output of AND gate 48 (indicative of a binary 1) is applied to the digit plane inhibit driver 50, thereby prohibiting circuit 50 from energizing the Z or inhibit winding 51 during the subsequent write interval. However, if the selected core was storing a binary 0 (read out during the previous read interval), the output signal of memory register 47 must be such as to permit the digit plane inhibit driver 50 to energize the Z winding 51 during the subsequent write cycle. The current in the Z winding prohibits the X and Y selection currents from storing a binary 1 in the selected core.

The foregoing description indicates that a particular core can be energized only by coincidentally pulsing the X and Y input windings. It follows that the device disclosed fulfills the requirements of a logical AND circuit similar to that disclosed in co-pending application Serial No. 530,524 filed August 25, 1955 by Edgar A. Brown. It is further apparent that since the improved magnetic core disclosed herein is operative as a logical storage element having two stable states, it may be incorporated in circuitry found in the computer art such as shift registers, binary adders, etc.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic core capable of assuming stable remanent conditions including a magnetic circuit having first and second segments each divided into a plurality of flux paths, means magnetically saturating each path of said first segment by applying a bias M.M.F. thereto, means selectively opposing the bias M.M.F. in predetermined paths of said first portion to establish a flux pattern in said magnetic circuit in a first or a second direction, and output means coupled to a path of said second segment for detecting a change in the flux pattern therein due to the operation of the means opposing said bias M.M.F.

2. A magnetic memory device including a closed magnetic circuit having stable remanent state defining a plurality of flux paths, bias means for saturating less than the total number of said flux paths in predetermined directions, means for reversing the direction of saturation in at least one of said paths, and means for sensing a flux change in an unbiased flux path.

3. A memory device comprising a core of magnetic material having two stable magnetic states and defining first, second and third portions; first winding means for magnetically biasing said first and second portions of said core; second winding means coupled to said core for selectively establishing a main flux in said core opposite to the bias in one of said first and second portions; and third winding means coupled to said third portion for sensing a flux change therein due to the energization of said second winding means.

4. A magnetic core operative as a memory device having stable magnetic states, said core defining a plurality of input legs and an output leg connected to said input legs by a main flux path, a bias winding linking each input leg, means for selectively saturating said main flux path in a first and a second direction, and an output winding linking said output leg.

5. A magnetic core coincidence circuit comprising a multi-legged structure having two stable states; said core defining a plurality of input members, an output member, a bypass member providing a flux path shunting said output member, and main flux paths connecting said input, output and bypass members; means for saturating said input members in predetermined directions; means coupled to said core for reversing the direction of saturation flux in at least one of said input members to thereby saturate said main flux path in either of two directions; and means for sensing a change in the flux pattern in said output leg.

6. A bistable memory device including; a closed path of magnetic material capable of attaining different stable states of residual flux density defining first, second and third apertures; a bias winding linking a first portion of said path adjacent said first aperture and a second portion of said path adjacent said second aperture; input winding means linking said closed path for selectively establishing a saturation flux in a clockwise or a counterclockwise direction; and output winding means linking a third portion of said path adjacent said third aperture.

7. The device of claim 6 wherein said bias winding is arranged as a figure 8 type winding to encompass said first and second portions of said path, whereby the bias flux in said first and second portions exists in opposite directions when a current is applied to said bias winding.

8. The device of claim 6 wherein said bias winding comprises a first conductor intersecting said first aperture, and a second conductor intersecting said second aperture; and bias current means for applying a predetermined unit of electrical current to said first conductor, and simultaneously applying one-half of said predetermined unit of current of opposite polarity to said second conductor; whereby the flux in said first and second portions of said path are biased in opposite directions.

9. A logical device comprising a closed magnetic circuit having stable remanent states and defining a first portion divided into at least first and secondary auxiliary flux paths and a further portion divided into a plurality of auxiliary flux paths, first winding means linking said first and second paths for maintaining a bias flux therein, second winding means linking said magnetic circuit for reversing the bias flux in one of said first and second paths, and output winding means linking one of said plurality of auxiliary flux paths.

10. A multi-legged magnetic storage element capable of attaining either of two opposite states of remanence; said element defining first, second, third and fourth legs; a bias winding linking said first and second legs for magnetically biasing said legs in opposite magnetic states; a plurality of input winding means linking said element for switching said element to the opposite remanent state; output winding means encompassing said fourth leg for sensing an alteration of the flux therein; said third leg providing a path wherein the flux pattern may be altered by energization of at least one of said input winding means; and means for selectively energizing said input winding means in either of two polarities, whereby the simultaneous energization of all said input winding means in a first polarity establishes a first flux pattern in said fourth leg and the simultaneous energization of all said input winding means in a second polarity establishes a second flux pattern in said fourth leg.

11. The apparatus as claimed in claim 10 wherein said bias winding comprises a figure 8 type winding defining first and second loops, said first loop encompassing said first leg and said second loop encompassing said second leg, whereby flux having opposite directions is respectively established in said first and second legs.

12. A magnetic memory array having a plurality of magnetic cores arranged in columns and rows, each said core comprising a magnetic circuit defining a first plurality of input legs and a second plurality of output legs; first input winding means linking each core in each said row; second winding means linking each said core in each said column; bias winding means encompassing each said input leg for establishing a similar bias flux pattern in each said core; output winding means linking one of said plurality of output legs of each core in said array, whereby the coincident energization of said first and second input winding means of a selected one of said cores in a first polarity is effective to establish a first flux pattern therein and coincident energization in a second polarity is effective to establish a second flux pattern; and inhibit winding means linking each said core for selectively prohibiting the establishment of said first flux pattern in the selected core.

13. A magnetic memory array having a plurality of magnetic cores, each said core defining first, second and third portions, first winding means for magnetically biasing said first and second portions of each said core, second winding means linking each said core for selectively establishing one of said cores in either of two remanent states, output winding means linking said third portion of each said core for sensing an altering of the flux therein, and means coupled to said first winding means for sufficiently increasing the magnetic bias in each core to nullify the effect of said second winding means on the remanent state of the selected core.

14. A memory device comprising a core of magnetic material having two stable states of remanence, said core defining a plurality of legs, bias means for saturating less than the total number of said legs in predetermined directions, means for reversing the direction of saturation in a biased leg to cause said core to be saturated in a predetermined direction, and means for sensing a flux change in an unbiased leg due to the flux reversal in said biased leg.

References Cited in the file of this patent

UNITED STATES PATENTS

| | | |
|---|---|---|
| 2,519,426 | Grant | Aug. 22, 1950 |
| 2,733,424 | Chen | Jan. 31, 1956 |
| 2,802,953 | Arsenault et al. | Aug. 13, 1957 |

OTHER REFERENCES

Publication: "The Transfluxor" (Rajachman), proceedings of the I.R.E., March 1956, pages 321–332.